Sept. 1, 1953 — M. W. MARIEN — 2,650,869
PISTON RING
Filed March 21, 1951
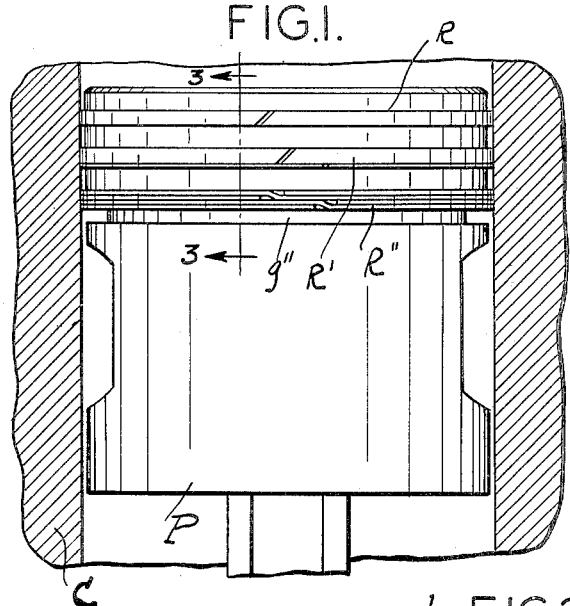
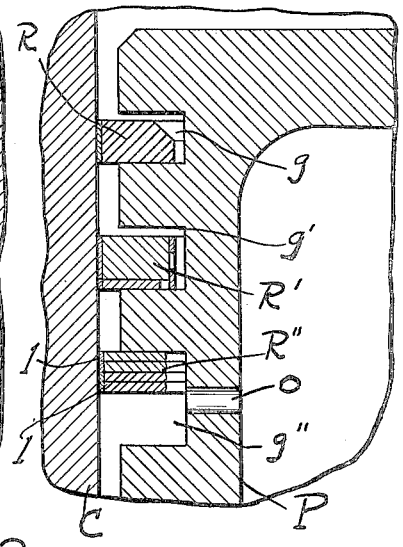
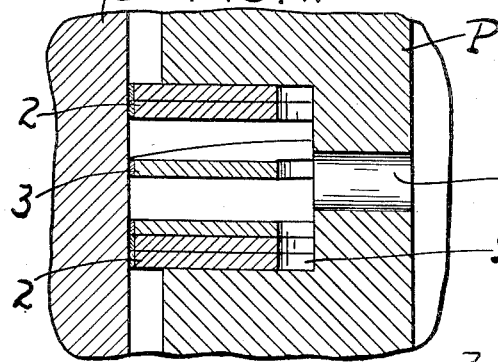
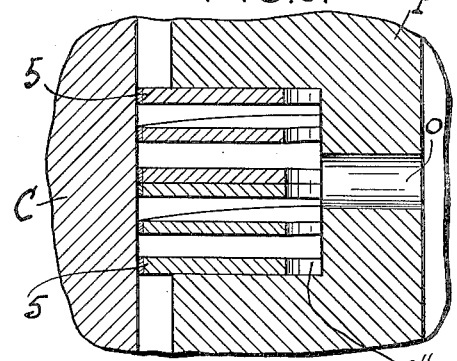
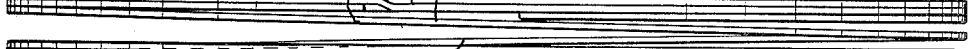
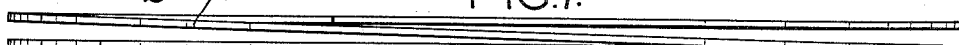
INVENTOR
MELVIN W. MARIEN,
BY Harry A. Dinner
ATTORNEY.

Patented Sept. 1, 1953

2,650,869

UNITED STATES PATENT OFFICE 2,650,869

PISTON RING

Melvin W. Marien, St. Louis, Mo., assignor to Ramsey Corporation, St. Louis, Mo., a corporation of Ohio Application March 21, 1951, Serial No. 216,800

6 Claims. (Cl. 309—45)

My invention has relation to improvements in piston rings of the type known as oil rings and consists in the novel features more fully set forth in the specification and pointed out in the claims.

The invention comprises a piston ring made up of a plurality of similar ring elements, each of which consists of a helical steel section having a plurality of coils or turns arranged in various combinations with respect to the pitch of the turns; i. e. some of the steel sections have the coils lying flat against each other, while others are separated to give the effect of a cushioning spring.

Another feature of the invention is that the assembly of ring elements has a freely floating action in the ring groove so as to, in effect, operate on the principle of a piston pump to expel excess oil from the groove on every stroke of the piston. This floating action is not akin to the limited movement of the conventional type of ring due to the normal working clearance of the same in the groove, but is a well defined stroke similar to that of a pump piston. I have found that this pumping action of the ring within the groove is made possible only by virtue of the helical form of the steel section. The helix provides an endless ring that winds and unwinds in action without losing its circularity. Hence it always remains in contact with the cylinder wall to serve as an effective oil seal.

These advantages, as well as others inherent in the invention will be better apparent from a detailed description thereof in connection with the accompanying drawings, in which:

Fig. 1 is a side elevation of a conventional piston equipped with my improved oil ring; Fig. 2 is a side elevation of the ring removed from the ring groove; Fig. 3 is an enlarged cross-section taken on the line 3—3 of Fig. 1; Fig. 4 is an enlarged cross-section of a modified form of ring mounted in a ring groove; Fig. 5 is a side elevation of the ring shown in Fig. 4 and removed from the groove; Fig. 6 is a cross-section of a further modified form of the invention; and Fig. 7 is a side elevation of the ring shown in Fig. 6.

Referring to the drawings, P represents a standard piston operable in a cylinder C, said piston being provided with the usual ring grooves $g$, $g'$, and $g''$ in which are lodged piston rings R, R' and R''. The rings R and R' are compression rings and form no part of the present invention. The ring R'' is an oil control ring and is the subject matter of the invention herein described. Further reference to piston rings herein will be restricted to ring R''.

By referring to Figs. 1, 2 and 3, it will be seen that the ring R'' is made up of two components 1, 1. These components are identical and are each made up of a thin ribbon of steel shaped in the form of a helix, preferably of two coils, or turns. Individually these helical steel rings are not new. However, they have generally been used in combination with cast iron rings of some conventional type, such as shown in U. S. Patent No. 2,128,372 of August 30, 1938. In the instant case, the manner in which these rings are adapted to the ring groove and their mode of operation are believed to be novel. A second novel feature of the present invention is the combination of helical ring sections of different constructions with respect to the spacing of the coils, or turns, which make up the helix. This will be more clearly apparent from the following description.

In Figs. 1 to 3 inclusive, the ring components comprising helical sections 1, 1 each comprise two coils, or turns, $a$, $a$, which lie flat against each other with no space between the adjacent coils. In order that the turns may be parallel, there is an offset $b$ between the turns, at which the turns terminate in the ends $e$, $e$.

The winding of the components 1 into the form of a helix of at least two turns produces a gapless ring that is still capable of expanding and contracting while in action within a cylinder, and, at the same time, retaining its circularity during such action so as, at all times, to maintain contact with the cylinder wall. Because of the intimate engagement of the helical sections with the cylinder wall, the sealing surface need not be so extensive as in ordinary rings, and I, therefore, do not have a ring of a width that will completely fill the ring groove. By referring to the drawings, it will be seen that I have a considerable amount of free space in the groove $g''$. In Figs. 1 and 2 this space is all on one side of the ring R'' so that as the piston P reciprocates in the cylinder C, the ring R'', itself, will partake of a pumping action in the groove. As the ring moves from the top to the bottom of the groove, it will be cushioned by the oil accumulated within the groove and excess oil will be forced out of the oil drainage ports $o$ at the bottom of groove $g$. This cushioning action of the oil protects the ring from excessive wear.

In the modification shown in Figs. 4 and 5, I insert between the flat helical ring sections 2, 2 a third helical section 3 which has its coils, or turns 4, 4, spread apart so as to impart a mild spring action which augments the hydraulic action of the oil in cushioning the action of the ring R³ as a whole.

In the modification shown in Figs. 6 and 7, I utilize two sections 5, 5 similar to section 3 of ring $R^3$ which collectively constitute ring $R^4$, the action of which is similar to that of ring $R^3$.

Obviously, all the forms herein shown function similarly as oil control rings, and I do not wish to be restricted to any one specific form.

In some applications of the invention, it may be advantageous to place a coating of chromium (or equivalent metal) on the cylinder contacting faces of ring components 1, 1 of the main form and components 2 and 3 of the form shown in Figs. 4 and 5, and helical sections 5, 5 of form shown in Figs. 6 and 7. The advantage of the chromium coating (preferably applied by plating) is that it avoids scuffing of the cylinder wall during the break-in period. This is important, in view of the high unit pressure of the steel sections and the greater hardness of the steel sections over the cast iron cylinder.

The chromium surface overcomes the attrition that would otherwise occur while the rings were being broken in.

Having described my invention, I claim:

1. In combination with a piston having a ring groove, a piston ring in said groove, said ring comprising at least two steel sections, each of which consists of a helix having at least two turns, said sections fitting loosely in the ring groove so as to have a decided pumping action in the groove during the action of the piston, said ring groove having oil drainage ports in the bottom thereof.

2. A piston ring comprising at least two steel sections, each of which comprises a helix having at least two turns, said turns being in non-contacting relation and the sections being in juxtaposition, and adapted to be floatingly mounted in the ring groove of the piston, and the combined thickness of said sections being less than the width of the ring groove of the piston, to accommodate said ring sections to move relative thereto and have a pumping action cushioned by the oil accumulating within the groove and forcing excess oil from the groove.

3. A piston ring comprising at least two steel sections, each of which consists of a helix having at least two turns, and a third helical section of at least two turns, said third section having its turns spread apart axially to operate as a spring cushion during the operation of the piston.

4. In combination with a piston having a ring groove, a piston ring in said groove, said ring comprising at least two steel sections, each of which consists of a helix having at least two turns, said sections fitting loosely in the ring groove so as to have a decided pumping action in the groove during the action of the piston, said ring groove having oil drainage ports in the bottom thereof, the circumferential surfaces of said sections being chromium coated.

5. A piston ring comprising at least two steel sections, each of which consists of a helix having at least two turns, and a third helical section of at least two turns, said third section having its turn spread apart axially to operate as a spring cushion during the operation of the piston, the circumferential surfaces of said sections being chromium plated.

6. A piston ring comprising at least two steel sections, each of which comprises a helix having at least two turns, said turns being in non-contacting relation and the sections being in juxtaposition, the circumferential surfaces of said sections being chromium coated.

MELVIN W. MARIEN.

References Cited in the file of this patent

UNITED STATES PATENTS

| Number | Name | Date |
|---|---|---|
| 2,030,927 | Marien | Feb. 18, 1936 |
| 2,073,500 | Sopp | Mar. 9, 1937 |
| 2,125,541 | Carlton | Aug. 2, 1938 |

FOREIGN PATENTS

| Number | Country | Date |
|---|---|---|
| 831,690 | France | June 13, 1938 |